United States Patent

[11] 3,540,748

[72] Inventor James R. Buck
Ross Township, Kalamazoo County, Michigan
[21] Appl. No. 729,147
[22] Filed May 15, 1968
[45] Patented Nov. 17, 1970
[73] Assignee Buck Tool Company
Kalamazoo, Michigan
a corporation of Michigan

[54] ADAPTER MECHANISM FOR UNTHREADED COLLETS
10 Claims, 3 Drawing Figs.

[52] U.S. Cl............................................. 279/1
[51] Int. Cl..................................................... B23b 13/12
[50] Field of Search............................................ 279/1, 1(R), 1(S)

[56] References Cited
UNITED STATES PATENTS
2,502,719 4/1950 Haley........................... 279/1(S)UX
2,647,701 8/1953 Cannard....................... 279/1(R)UX
2,922,656 1/1960 Belloli.......................... 279/1(S)UX Primary Examiner—Robert C. Riordon
Assistant Examiner—Donald D. Evenson
Attorney—Woodhams, Blanchard and Flynn ABSTRACT: An adapter for a nonthreaded collet including a sleeve positionable within a bore formed within the collet. An expansion member surrounds the sleeve and is adapted to expand into radial gripping engagement with the collet when subjected to an axial force. Axial force-applying means are threadably engaged within the sleeve and include a radially extending abutment member adapted to contact and compress the expansion member for causing same to radially expand into gripping engagement with the collet. The axial force means are further adaptable to have either or both an adjustable stop member and/or an ejector mechanism mounted thereon.

Patented Nov. 17, 1970

3,540,748

INVENTOR.
JAMES R. BUCK
BY
Woodhams, Blanchard & Flynn
ATTORNEYS

ADAPTER MECHANISM FOR UNTHREADED COLLETS

FIELD OF THE INVENTION

This invention relates to an adapter for a collet and more particularly relates to an adapter positionable and fixable within a nonthreaded bore formed in the collet with the adapter having either or both an adjustable stop member and/or an ejector mechanism mounted thereon.

BACKGROUND OF THE INVENTION

The great majority of collets utilized in industry have a workpiece receiving bore extending therethrough, which bore is provided with a substantially smooth surface throughout the length thereof. However, occasionally it is desirable or necessary to mount an adapter on the collet to permit the performance of a special function. In particular, it is often desirable to mount an adjustable stop mechanism or an ejector mechanism on the end of the collet. However, none of the prior known collet adapters, insofar as I am aware, have been mountable directly in the end of a conventional collet having a smooth cylindrical bore therethrough.

In the industrial use of collets, the collet is generally provided with a throughbore in order to permit workpieces to be axially moved through the bore without interfering with the gripping function. Further, this type of utilization of collets constitutes a high percentage of collet usage. However, as pointed out above, situations often arise when it becomes necessary to mount an adapter such as an ejector mechanism or a stop mechanism on the collet adjacent the rearward end thereof. However, these situations wherein the use of an adapter is necessary only represents a small percentage of the normal collet applications.

The prior known collet adapters have been provided with a thread thereon which is adapted to mate with a similar thread provided on the inside of the collet so as to permit the adapter to be securely mounted on the end of the collet. However, this type of an adapter having a threaded connection to the collet is undesirable since it is more expensive than an unthreaded collet and the normal usage of the collet does not require the provision of a thread thereon. Rather, the normal collet is provided with a smooth cylindrical bore extending therethrough and thus it has often been necessary for users of collets who are already equipped with unthreaded collets to acquire a second complete set of collets, such latter set having a thread on the end of the bore for permitting an adapter to be mounted thereon.

The necessity of having to stock an extra set of threaded collets creates obvious problems since the user of the collets now has to provide storage space for the threaded collets, even though same are utilized only a small percentage of the time. Also, the need to own a set of threaded collets is expensive since the user has substantially doubled the amount of capital invested in collets.

Not only is it expensive and undesirable for the user of collets to own two separate sets of collets, but it is also undesirable for dealers and manufacturers to have to manufacture and store two substantially identical sets of collets with one set being threaded and the other set being unthreaded. The need to possess two sets of collets creates substantial inventory and storage problems for the user, the dealer and the manufacturer. The seriousness of this problem is clearly shown when one considers that collets are generally manufactured in size ranges varying by one sixty-fourth inch, such that if a user stocks collets having a size range varying from ¾ to 1¼ inches, which collets vary in increments of one sixty-fourth inch, then such a size range will require that the user possess 33 different collets within a single set covering such a size range. Consequently, if the user has to stock a separate set of threaded collets, then he is required to own and stock 66 collets.

In addition, the necessity of having to utilize a special threaded collet when it is desired to utilize an adapter, such as an adjustable stop mechanism or an ejector mechanism, is highly undesirable since it requires that the user of the collet replace the conventional smooth bore collet with a threaded collet in order to permit the adapter to be mounted thereon. This necessitates that the apparatus having the collet mounted thereon be shut down so that the collets can be interchanged. This shutdown is obviously undesirable since it renders the working operation inefficient and therefore expensive.

Accordingly, it is an object of this invention to provide:

1. An adapter which can be securely mounted on the end of a conventional collet having a smooth cylindrical bore therethrough.
2. An adapter, as aforesaid, which is slideably received within the smooth cylindrical bore of a conventional unthreaded collet.
3. An adapter, as aforesaid, which can be utilized with either or both an adjustable stop mechanism and/or an ejector mechanism.
4. An adapter, as aforesaid, having gripping means and force-applying means, the force-applying means causing the gripping means to radially expand into tight gripping engagement with the collet.
5. An adapter, as aforesaid, which utilizes a common gripping means which can have attached thereto interchangeable force-applying means, which force-applying means functions as an adjustable stop mechanism and/or an ejector mechanism.
6. An adapter, as aforesaid, wherein the gripping means utilizes a pair of spaced resilient expandable members adapted to be expanded into gripping engagement with the collet for permitting the adapter to be properly aligned and fixedly secured to the collet.
7. An adapter, as aforesaid, which is easily installed or removed from conventional collets having smooth cylindrical bores therethrough.
8. An adapter, as aforesaid, which is relatively inexpensive to manufacture, simple to utilize, and requires a minimum of maintenance.

Other objects and purposes of this invention will be apparent to persons acquainted with apparatus of this general type upon reading the following specification and inspecting the accompanying drawings.

Figure 1:
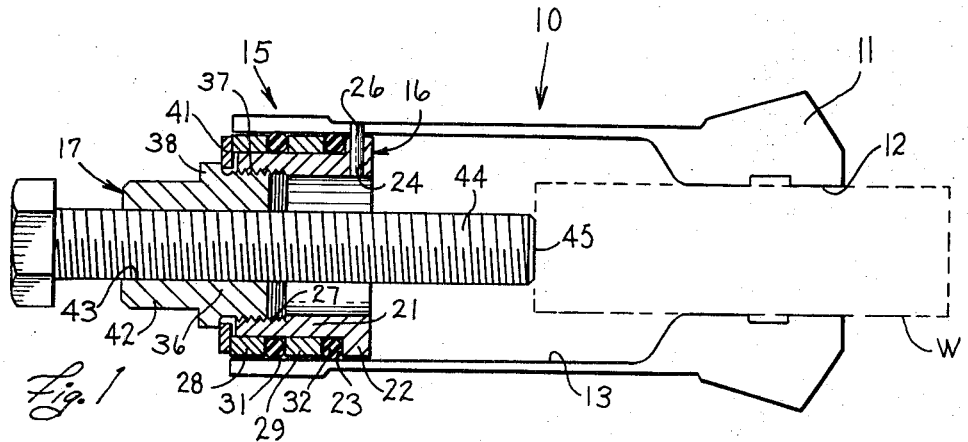
FIG. 1 illustrates a partial, cross-sectional view of an adapter according to the present invention.

Certain terminology will be used in the following description for convenience in reference only and will not be limiting. The words "upwardly", "downwardly", "rightwardly" and "leftwardly" will designate directions in the drawings to which reference is made. The words "front" or "forward" will refer to the side of the adapter facing the collet jaws, while the words "rear" or "rearward" will refer to the opposite side of the adapter. The words "inwardly" and "outwardly" will refer to directions toward and away from, respectively, the geometric center of the device and designated parts thereof. Said terminology will include the words above specifically mentioned, derivatives thereof and words of similar import.

SUMMARY OF THE INVENTION

In general, the objects and purposes of the invention are met by providing a gripping means containing expansion members which are positionable within the end of a collet, the gripping means coacting with a force applying means for causing the expansion members to radially expand into gripping engagement with the collet for fixedly securing the adapter thereto.

Specifically, the gripping means includes a stepped sleeve having a shoulder thereon which sleeve is surrounded by at least one elastomeric expansion ring which is positioned between the shoulder and a spacer ring. The sleeve is internally threaded so as to receive a force-applying member therein, which force-applying member has a radially extending abutment which is adapted to contact the spacer member and apply an axial force thereto when the force-applying member is rotatably threaded into engagement with the sleeve. Application of axial force to the spacer member causes the expansion member to radially expand into tight gripping engagement with the internal periphery of the bore formed in the collet. The force-applying mechanism contains a bore therein in which is positioned either or both of a spring ejector mechanism or a threaded adjustable stop member.

DETAILED DESCRIPTION

The manner in which the adapter of the present invention cooperates with a collet is illustrated in FIG. 1 wherein there is shown a collet 10 provided with jaws 11 on one end thereof containing a workpiece opening 12 therethrough, which workpiece opening is in communication with an enlarged bore or opening 13 which extends throughout the length of the collet, the bore 13 being provided with a substantially smooth cylindrical wall throughout the length thereof.

Mounted within the end of the collet 10 is an adapter mechanism 15 representing the present invention, which adapter mechanism includes a gripping device 16 and a force-applying means 17.

The gripping device 16 includes therein a sleeve 21 which has a flange 22 connected, here integrally, adjacent the front end thereof, which flange defines a rearwardly facing shoulder 23. The flange 22 has a radially extending opening 24 therethrough in which is received a pin 26, which pin also extends through a similar opening formed in the periphery of the collet 10 for preventing the sleeve 21 from rotating relative to the collet. The rearward end of the sleeve 21 is internally threaded at 27 for a purpose to be explained hereinafter.

The sleeve 21 is surrounded by a pair of cylindrical, ringlike spacer elements 28 and 29 which are slideably received on the periphery of the sleeve. A pair of expansion members 31 and 32 also surround the sleeve 21, being alternately spaced between the spacer elements 28 and 29 and the shoulder 23 in the manner as illustrated in FIG. 1. The expansion members 31 and 32 are preferably O-rings constructed from a resilient elastomeric material such that upon being compressed in a direction axially of the sleeve, they will expand radially relative to the sleeve for a purpose to be explained hereinafter.

The expansion members 31 and 32, when in a relaxed condition, preferably have an outside diameter which is substantially equal to or slightly less than the internal diameter of the bore 13 formed in the collet so as to permit the adapter mechanism 15 to be easily and slideably inserted into the end of the bore in the manner illustrated in FIG. 1.

Considering now the force-applying means 17, same includes an actuator member in the form of a force-applying sleeve or nut member 36 having a threaded portion 37 formed on one end thereof, which threaded portion 37 is adapted to be engaged within the threaded portion 27 formed on the sleeve 21. The nut 36 is integrally formed with a radially extending flange 38 thereon adjacent the rearward end of the threaded portion 37, which flange radially extends outwardly beyond the periphery of the threaded portion 37. An abutment member 41, preferably in the form of a washer or disk, is positioned adjacent the front side of the flange 38, the opposite axial faces thereof being adapted to contact the flange 38 and the rear spacer element 28 as illustrated in FIG. 1. Alternatively, if desired, the flange 38 can be radially extended outwardly so as to directly contact the rear spacer member 28, in which case the intermediate abutment member 41 can be eliminated.

The force-applying nut 36 is further provided with a rearward extension 42, the external periphery of which can be of a hexagonal configuration if desired to permit the nut 36 to be engaged by a conventional wrench or similar tool whereby the nut can be rotatably engaged within the gripping sleeve 21. The force-applying nut 36 has an internally threaded opening 43 extending therethrough, in which is received a stop member 44, here in the form of a threaded screw member, which screw member 44 has the end 45 thereof adjustably positioned axially within the bore 13 of the collet 10, the end 45 being adapted to be contacted by a workpiece W for selectively positioning same.

OPERATION

The operation of the device embodying the invention will be described in detail hereinbelow for a better understanding of the invention.

When it is desired to mount the adapter of the present invention on a conventional collet, the force-applying sleeve or nut 36 will be loosened relative to the gripping sleeve 21 so as to move the flange 38 axially away from the rear spacer element 28, thereby removing any appreciable axial force imposed on the expansion members 31 and 32. The adapter mechanism 15 will then be slideably inserted into the bore 13 formed in the collet 10. Since the external diameter of the expansion members 31 and 32 in the relaxed condition is substantially equal to the internal diameter of the bore 13, the expansion members will substantially slideably engage the bore 13 when the adapter 15 is inserted therein so as to insure that the adapter is substantially coaxially aligned with the collet 10. Pin 26 will then be inserted through the opening formed in the collet into the opening 24 formed in the gripping sleeve 21 so as to prevent rotation of same relative to the collet.

Force-applying sleeve 36 is then rotated inwardly into engagement with the gripping sleeve 21, which rotational movement causes the flange 38 to move axially inwardly toward the rearward face of the gripping sleeve 21. Movement of flange 38 causes a corresponding movement of abutment member 41 which comes into contact with the rear spacer element 28. Continued inward axial movement of the flange 38 and the abutment member 41 causes imposition of an axial force on the rear spacer element 28, which force is transmitted through the other spacer element 29 and the expansion members 31 and 32 to the shoulder 23. The axial force imposed on the elastomeric expansion members 31 and 32 causes the O-ring members to be compressed in an axial direction, whereupon same tend to expand radially inwardly and outwardly and thus tightly frictionally engage the internal periphery of the bore 13 and the external periphery of the sleeve 21 so as to prevent relative axial and rotary movement therebetween.

After the expansion members 31 and 32 have been expanded so as to fixedly secure the adapter mechanism 15 within the collet 10, the adjustable stop member 44 is then rotated so as to position the forward end 45 thereof in a selected position relative to the collet whereupon same is adapted to be contacted by the end of a workpiece W inserted into the collet.

MODIFICATIONS

Figure 2:
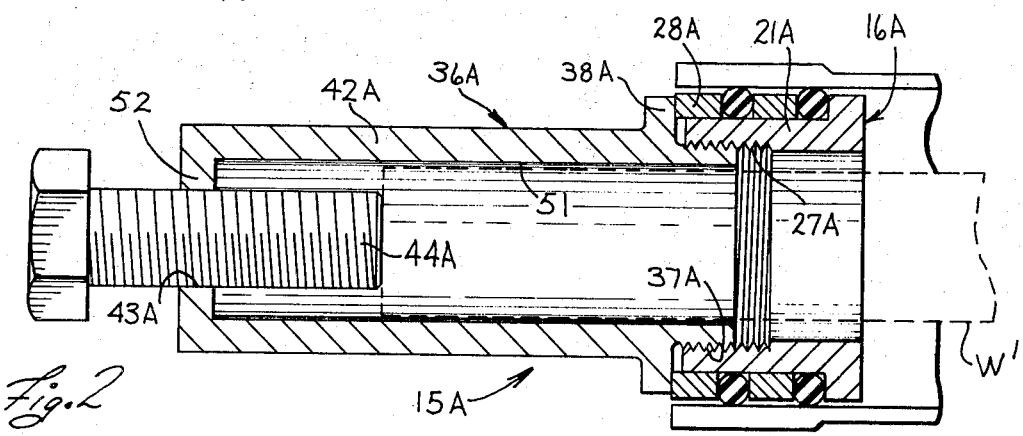
FIG. 2 is a partial, cross-sectional view illustrating a modification of the adapter of FIG. 1.
Figure 3:
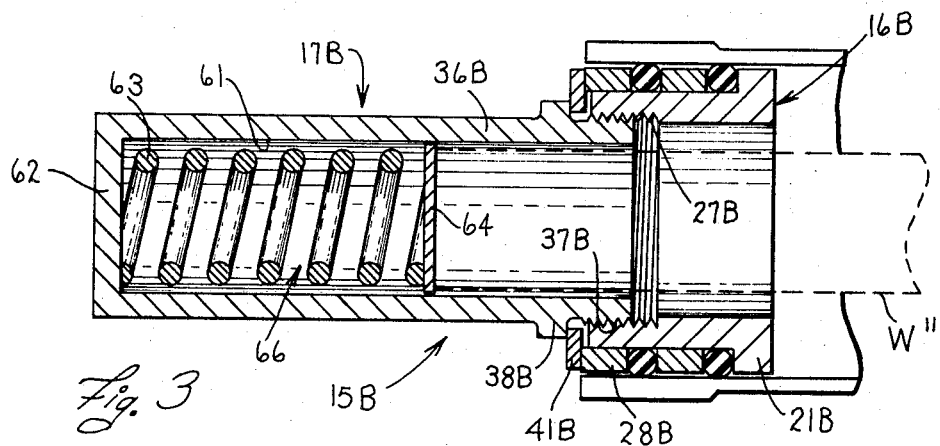
FIG. 3 is a partial, cross-sectional view illustrating a still further modification of the adapter of FIG. 1.

FIGS. 2 and 3 illustrate modifications of the present invention. The components of the embodiment of FIG. 2 which are substantially identical to the corresponding components of the embodiment of FIG. 1, will be referred to by the same reference numeral with the suffix A added thereto. Similarly, the parts of FIG. 3 will be referred to by the same reference numerals as utilized to designate the corresponding parts of FIG. 1 but with the suffix B added thereto.

The adapter mechanism 15A illustrated in FIG. 2 utilizes therein a gripping device 16A which is identical to the gripping device utilized in FIG. 1. The gripping sleeve 21A has a threaded portion 27A which is engaged by a similar threaded portion 37A formed on the end of the force-applying sleeve 36A. The sleeve 36A is provided with an elongated extension 42A which terminates in an end wall 52 through which extends a threaded opening 43A, a threaded stop member 44A being received therein. The force-applying sleeve 36A is additionally provided with an enlarged opening or bore 51 therein which is of a diameter so as to permit the workpiece W' to be inserted therein. Further, the force-applying sleeve 36A is provided with an integral enlarged abutment flange 38A thereon which directly contacts the rear spacer member 28A, thereby eliminating any need for the intermediate abutment member 41.

The force-applying sleeve 36A of FIG. 2 is thus substantially identical to the force-applying sleeve 36 of FIG. 1 except that the sleeve 36A is substantially axially longer than the sleeve 36 and contains the enlarged opening 51 therein. The sleeve 36A is used when the workpiece extends beyond the rearward end of the collet, the sleeve 36A thus effectively extending the length of the collet while at the same time providing an adjustable stop member 44A for controlling the position of the end of the workpiece W'.

The modification of FIG. 3 utilizes therein an ejector mechanism rather than a stop mechanism as used in the embodiments of FIGS. 1 and 2 discussed above. Again, the adapter mechanism 15B utilizes gripping device 16B therein which is identical to the gripping device 16 disclosed in FIG. 1. The force-applying means 17B again includes an elongated force-applying sleeve 36B which has a threaded portion 37B formed on the forward end thereof adapted to be threadably engaged within a threaded portion 27B internally formed on the rearward end of the gripping sleeve 21B. The force-applying sleeve 36B also has a radially extending abutment flange 38B formed thereon which coacts with the abutment member 41B and the rear spacer member 28B in the same manner as discussed above. The force-applying sleeve 36B has an enlarged opening or bore 61 extending substantially throughout the length thereof, the rearward end thereof containing a shoulder or other suitable means, such as being closed by the end wall 62.

Positioned within the opening 61 of the sleeve 36B is an ejector mechanism 66, which ejector mechanism includes a compression spring 63 having one end bearing against the end wall 62 and the other end thereof bearing against the slideable bearing plate 64. Bearing plate 64 is adapted to be contacted by the end of the workpiece W" when same is inserted into the collet whereupon the bearing plate 64 is moved rearwardly so as to compress the spring 63 with the workpiece then being held in place by the collet. When the desired operation on the workpiece has been performed, the collet is released whereby the spring 63 urges or ejects the workpiece W" outwardly so as to permit same to be easily removed from the collet.

If desired, the ejector spring 63 may be telescoped over the screw 44A and either permitted to act directly against the workpiece W' or arranged with the bearing plate 64 against the end of the screw 44A. Thus, the adapter will function both as a stop mechanism and as an ejector mechanism.

As will be apparent from an inspection of FIGS. 1, 2 and 3, all of these embodiments utilize a substantially identical gripping device 16 therein. Further, all of these devices utilize a substantially identical force-applying sleeve 36 having a threaded portion adapted to be engaged within the gripping sleeve 21 and a radially extending abutment portion 38 adapted to coact with the spacer elements for applying an axial compression force to the expansion members whereby same expand and frictionally grip the collet. Thus, the user of the collet no longer has to maintain two separate sets of collets since the adapter of the present invention completely eliminates the need to stock collets having a threaded bore therein.

Further, the present invention does not require that the user stock a plurality of different types of adapters since the gripping device 16 utilized in the adapter of the present invention is usable with any of the force-applying sleeves 36, 36A or 36B. Further, if desired, the user of the adapter of the present invention can further reduce the amount of inventory by utilizing a single force-applying sleeve, such as the sleeve 36A, for accomplishing the function of all of the three embodiments illustrated in FIGS. 1—3. For example, the adapter mechanism illustrated in FIG. 2 can be utilized to perform the same function as the adapter illustrated in FIG. 1 merely by utilizing a long screw member 44A such that the end thereof extends into the exterior of the bore 13 formed in the collet. Further, the force-applying sleeve 36A of FIG. 2 can be utilized as an ejector mechanism either by removing the screw member 44A from the sleeve and inserting the ejector spring 63 and the bearing plate 64 within the opening 51 so that same functions in substantially the same manner as the embodiment illustrated in FIG. 3 or, as above suggested the ejector 63 and the stop screw 44A may be used together in said sleeve 36A. Thus, the adapter mechanism of the present invention possesses greater overall adaptability than was true of the prior known adapter devices and thus permits a substantial reduction in the inventory maintained by a user, both in terms of different types of collets and in terms of different types of adapters which have to be stocked.

Further, while the adapter mechanism of the present invention preferably utilizes at least two axially spaced expansion members as illustrated in FIGS. 1—3, it will be understood that the adapter mechanism could successfully utilize only a single expansion member for gripping the collet.

Although particular preferred embodiments of the invention have been disclosed above for illustrative purposes, it will be understood that variations or modifications thereof which lie within the scope of the appended claims are fully contemplated.

I claim:

1. In combination with a collet having a bore therethrough, the collet having radially movable jaws adjacent one end thereof for engagement with a workpiece insertable into the bore, and an adapter disposed at least in part within the bore of the collet for coacting with an adjacent end of the workpiece, said adapter comprising:

sleeve means freely positionable within the bore of said collet and having an external shoulder thereon, said sleeve means having a central opening extending coaxially therethrough;

expansible gripping means mounted on said sleeve means and slideably insertable into said bore and expansible into tight gripping engagement with said collet for fixedly securing said sleeve means relative to said collet;

said expansible gripping means including at least one annular ringlike expansion member surrounding said sleeve means and positioned adjacent said shoulder, said expansion member being constructed of a nonmetallic compressible material capable of expanding radially outwardly into gripping engagement with said collet upon application of an axially directed force thereto;

force-applying means coacting with said gripping means for applying an axial force to said expansion member to move same radially into gripping engagement with said collet, said force-applying means including an actuator member threadably engaged with said sleeve means for permitting relative rotational and axial movement therebetween, said actuator member including a second bore extending at least partially therethrough, said second bore being coaxial with the opening in said sleeve means;

said force-applying means further including abutment means disposed opposite and axially movable toward said shoulder for causing axial compression of said expansion member whereby said expansion member expands radially outwardly into gripping engagement with said collet; and workpiece-engaging means mounted on said force-applying means for contacting the adjacent end of a workpiece inserted into the bore of the collet, said workpiece-engaging means including an engaging member disposed at least in part within said second bore and mounted for axial movement relative to both said actuator member and said sleeve means.

2. The combination defined in claim 1, wherein said gripping means includes a spacer element slidably mounted on said sleeve means in surrounding relationship thereto, said spacer element being positioned between said expansion member and said force-applying means.

3. positioned The combination defined in claim 1, wherein said gripping means includes first and second axially spaced spacer elements slidably mounted on said sleeve means in surrounding relationship thereto, said above-mentioned expansion member being positioned between said first spacer element and said shoulder and adapted to be in abutting contact therewith, said gripping means further including a second expansion member positioned between the adjacent ends of said first and second spacer elements and in abutting contact therewith, said expansion members each comprising O-rings of resilient elastomeric material, and the other end of said second spacer element being adapted to be abuttingly contacted by said force-applying means for causing slideable movement of said spacer elements and radial expansion of said expansion members into gripping engagement with said collet.

4. The combination according to claim 1, wherein said second bore extends through said actuator member with at least a portion of said second bore being threaded, and said workpiece-engaging means including an elongated stop member extending through the threaded portion of said second bore and having a threaded portion threadably engaged therewith whereby rotation of the stop member permits the axial position thereof to be adjusted relative to the collet and independently of the axial force imposed on the expansible gripping means.

5. The combination according to claim 4, wherein said actuator member has an end portion which extends axially outwardly beyond the adjacent end of the collet, the end portion of the actuator member having means thereon for permitting rotation of the actuator member relative to the sleeve means for causing the gripping means to be expanded into gripping engagement with the collet, and the elongated stop member comprising a screw member threadably engaged within and extending through the threaded portion of the second bore, said screw member having a head portion positioned axially outwardly from the end portion of the actuator member for permitting independent adjustment of the stop member after the adapter has been fixedly positioned within the collet.

6. The combination according to claim 1, wherein the workpiece-engaging means includes a spring member disposed within said second bore, said spring member having one end thereof axially fixed relative to the actuator member with the other end of the spring means being adapted to coact with the adjacent end of a workpiece inserted into the collet for applying an ejecting force thereto.

7. The combination according to claim 1, wherein at least a portion of the opening extending through the sleeve means is threaded, said actuator member having a threaded portion on one end thereof threadably received within the threaded portion of said sleeve means, said abutment means being axially spaced rearwardly of said threaded portion and extending radially outwardly beyond said sleeve means for permitting said abutment means to apply an axially directed force to said expansion member.

8. An adapter for a collet having a bore therethrough and additionally having radially movable workpiece-engaging jaws disposed adjacent one end thereof, comprising:

sleeve means freely positionable within the bore of said collet and having an external shoulder thereon, said sleeve means having a central opening extending coaxially therethrough;

expansible gripping means mounted on said sleeve means and slideably insertable into said bore and expansible into tight gripping engagement with said collet for fixedly securing said sleeve means relative to said collet;

said expansible gripping means including at least one annular ringlike expansion member surrounding said sleeve means and positioned adjacent said shoulder, said expansion member being constructed of a nonmetallic compressible material capable of expanding radially outwardly into gripping engagement with said collet upon application of an axially directed force thereto;

force-applying means coacting with said gripping means for applying an axial force to said expansion member to move same radially into gripping engagement with said collet, said force-applying means including an actuator member threadably engaged with said sleeve means for permitting relative rotational and axial movement therebetween, said actuator member including a second bore extending at least part way therethrough, said second bore being substantially coaxial with the opening in said sleeve means;

said force-applying means further including abutment means disposed opposite and axially movable toward said shoulder for causing axial compression of said expansion member between said shoulder and said abutment means whereby said expansion member expands radially outwardly into gripping engagement with said collet; and workpiece-engaging means mounted on said force-applying means for contacting an adjacent end of a workpiece when the workpiece is inserted into the collet, said workpiece-engaging means including an engaging member disposed at least in part within said second bore and mounted for axial movement relative to both said actuator member and said sleeve means.

9. An adapter according to claim 8, wherein said second bore extends axially through said actuator member with at least a portion of said bore being threaded, and said workpiece-engaging means comprising an elongated screw member threadably engaged within and extending through the threaded portion of said second bore, whereby rotation of said screw member permits the axial position thereof to be adjusted relative to the collet and independently of the axial force applied to the gripping means, the inner end of the screw member being disposed for contact by a workpiece inserted into the collet, and the outer end of the screw member having a head portion disposed axially outwardly from an adjacent end of the actuator member.

10. An adapter according to claim 8, wherein said gripping means includes at least two axially spaced expansion members with each of said expansion members comprising an O-ring of resilient and compressible elastomeric material, said O-rings when in the relaxed condition each having substantially circular cross section and an outside diameter substantially equal to the diameter of the bore formed in the collet.